United States Patent [19]

Raidel, II

[11] Patent Number: 4,773,670
[45] Date of Patent: Sep. 27, 1988

[54] SUSPENSION SYSTEM WITH WISHBONE STABILIZATION ASSEMBLY

[76] Inventor: John E. Raidel, II, 4925 Royal Dr., Springfield, Mo. 65804

[21] Appl. No.: 11,909

[22] Filed: Feb. 6, 1987

[51] Int. Cl.[4] .......................... B60G 9/00; B60G 11/24
[52] U.S. Cl. .................................... 280/688; 280/683; 280/685; 280/713
[58] Field of Search ............... 280/683, 688, 702, 709, 280/684, 685, 713

[56] References Cited

U.S. PATENT DOCUMENTS

| | | | |
|---|---|---|---|
| 3,237,957 | 3/1966 | Harbers | 280/683 |
| 3,740,070 | 6/1973 | Butler et al. | 280/683 |
| 4,504,079 | 3/1985 | Strong | 280/683 |

*Primary Examiner*—Richard A. Bertsch
*Attorney, Agent, or Firm*—Rogers, Howell, Moore & Haferkamp

[57] ABSTRACT

A hanger depending downwardly from a side of the chassis supports a torque beam and a lift spring which is mounted between a plate and the torque beam. A cross channel assembly is connected between the hangers of opposite sides of the vehicle. The forward central portion of a wishbone stabilizer assembly is connected to the center of the channel assembly by a special resilient spring and bushing assembly. The wishbone stabilizer assembly has diverging arms. The rearward end of each arm is journalled on a bushing assembly that is mounted in an axle seat assembly. Similarly, the rearward end of the torque beam is journalled on a bushing assembly that is also mounted in the axle seat assembly, and in a longitudinal direction, the stabilizer arm and the torque beam act as a parallelogram to stabilize the axle seat and maintain the pitch of the axle. An air spring is mounted between the axle seat and the chassis and is located directly above the axle. The wishbone stabilizer assembly provides a component of parallelogram stabilization and eliminates the need for a sway bar. The resulting suspension system is highly compact and free from interference with a vehicle drive shaft.

13 Claims, 2 Drawing Sheets

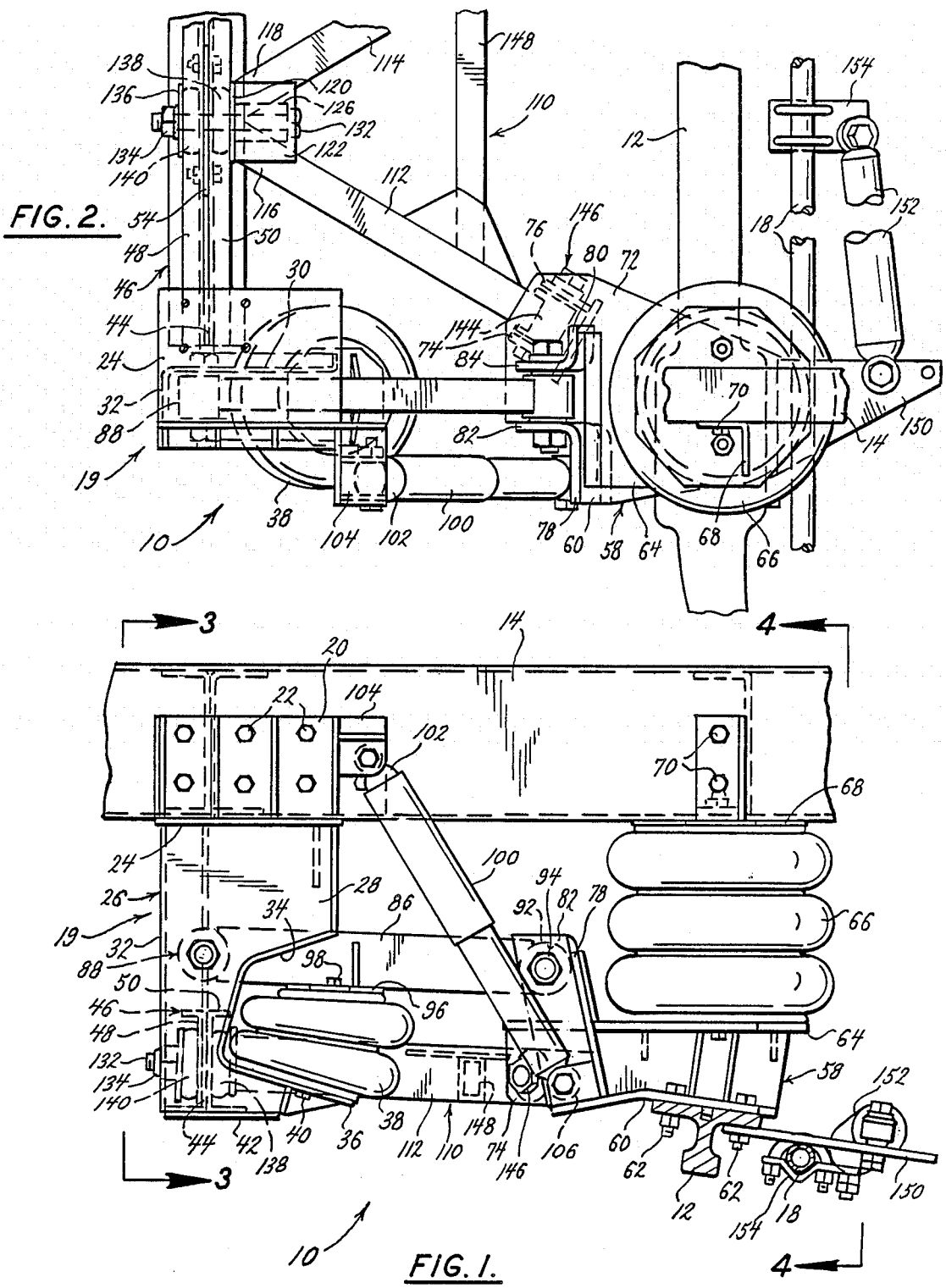

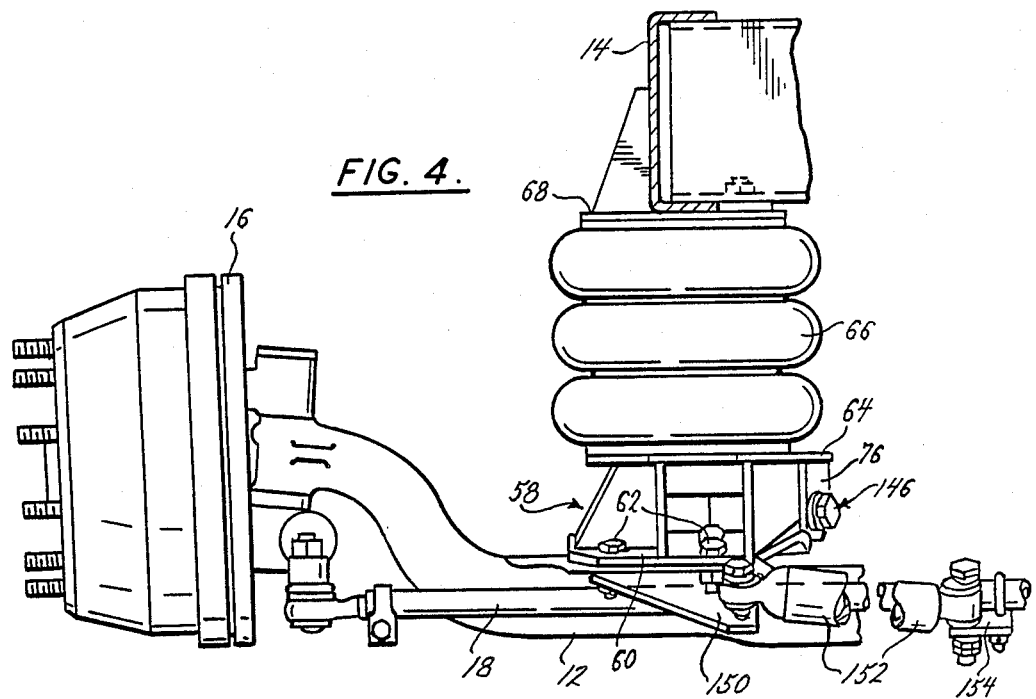
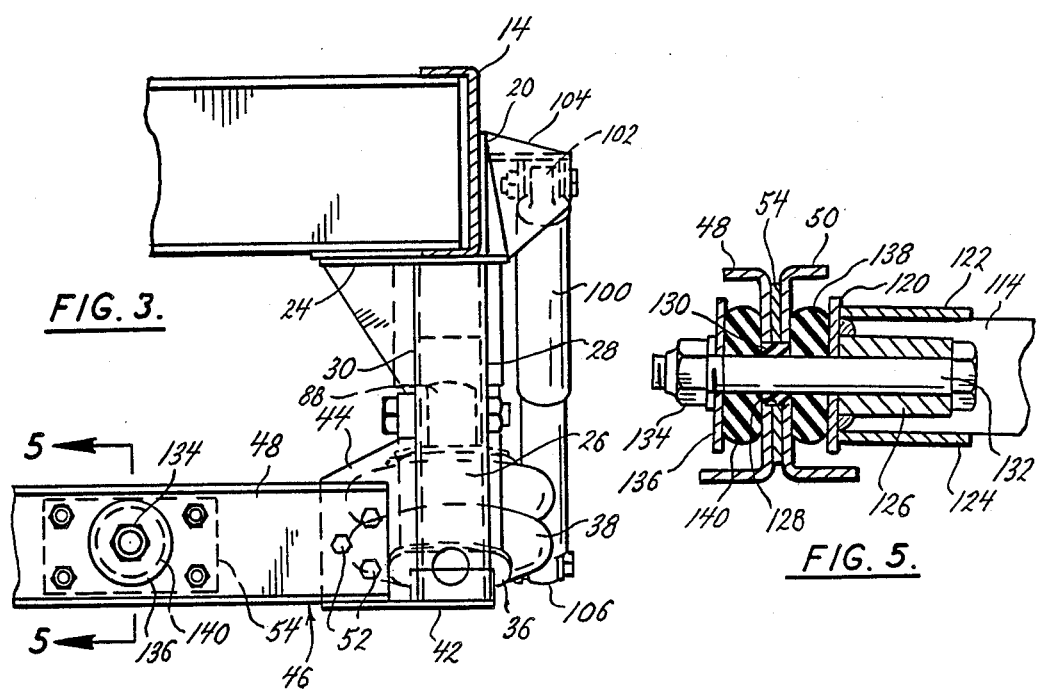

SUSPENSION SYSTEM WITH WISHBONE STABILIZATION ASSEMBLY

BACKGROUND AND SUMMARY OF THE INVENTION

This invention relates to a vehicle suspension system and particularly to a vehicle suspension system that incorporates a special wishbone stabilization assembly that cooperates with a torque beam to define parallelogram stabilization on both sides of the axle and incorporates a lift spring, all in a highly compact air spring suspension.

This suspension system is particularly suited for a pusher or trailing axle application. The suspension system is extremely compact with various components serving a plurality of functions. In brief, the suspension system includes a hanger assembly that depends downwardly from a side rail of the vehicle chassis. The hanger assembly provides a connection for a bushing assembly on which the end of a torque beam is mounted. The hanger assembly also provides a seat for supporting the bottom end of a lift spring with the top end being connected to the torque beam. The lift spring has a built-in bumper that limits downward travel of the axle. Also, a shockabsorber becomes fully extended to assist the lift spring in this limiting function.

A cross channel member is connected between the hanger assembly and a like hanger assembly on the opposite side of the vehicle. The cross channel assembly serves as a stabilizing connection between the hanger assemblies. The cross channel assembly also provides a point of installation for the forward central portion of a wishbone stabilizer assembly. The wishbone stabilizer assembly comprises a pair of diverging arms that are joined together at their forward ends where the assembly is connected to the cross channel assembly by a unique bushing and marsh spring assembly.

An axle seat assembly provides connections to the axle. It also provides connection points for the rearward ends of the torque beam and one of the diverging arms of the wishbone stabilizer assembly. The axle seat assembly further provides a connecting point for a shock absorber and through its connection to the axle, provides a connection for a bracket to which an end of a hydraulic cylinder is connected, the other end being connected to the tie rod.

The wishbone stabilizer assembly provides a lower component of a parallelogram, the upper component of which is defined by the torque beam and both components are pivotally connected between the hanger and cross channel assembly and the axle seat assembly. The wishbone stabilizer assembly also provides lateral stabilization and eliminates the need for a sway bar. Thus the wishbone stabilizer assembly provides a common link between the left and right side suspension systems and provides the lower parallelogram component for both sides in cooperating with their respective torque beams.

The special resilient bushing and marsh spring assembly that connects the wishbone stabilizer assembly to the cross channel assembly allows for conical movement of the wishbone stabilizer assembly. This complex connection accommodates the complex movements of the wishbone stabilizer assembly, such as occur when one side only of the vehicle moves vertically relative to the axle.

The diverging arms of the wishbone stabilizer assembly cooperate with the torque beams to provide lateral stabilization and eliminate the need for a sway bar or lateral guide. Because the two torque beams on opposite sides of the vehicle prevent the axle from moving longitudinally, and because the angular convergence of the arms of the wishbone stabilizer assembly would require longitudinal movement of the axle in the event of sway, the resulting combination eliminates sway of the axle.

The parallelogram maintains constant pitch or caster of the axle. Also, by preventing the axle seat from rotating about a transverse axis, the parallelogram maintains the attitude of the air spring, utilizing its full stroke.

DETAILED DESCRIPTION OF THE DRAWINGS

FIG. 1 is a side elevation view of the suspension system;

FIG. 2 is a top plan view of the suspension system;

FIG. 3 is a front elevation view of the suspension system as viewed along the plane of the line 3—3 of FIG. 1, with parts shown in section;

FIG. 4 is a rear elevation view of the suspension system as viewed along the plane of the line 4—4 of FIG. 1, with parts shown in section; and FIG. 5 is an enlarged view in section as viewed along the plane of the line 5—5 of FIG. 3.

DETAILED DESCRIPTION OF PREFERRED EMBODIMENT

This suspension system 10 is shown installed on a vehicle of the kind having an axle 12 located below a chassis that has a left side rail 14, and it will be understood that there is a similar right side rail on the right side of the vehicle. A wheel hub 16 is supported by the axle 12, and a tie rod 18 is connected between the wheel hub 16 and another wheel hub on the opposite side of the axle 12 in the manner known in the art. It will further be understood that the components illustrated and described as being located on the left side of the vehicle have counterpart components on the right side of the vehicle.

The components of the suspension system 10 that are on the left side of the vehicle (and that are duplicated, but now shown, on the right side of the vehicle) include a hanger assembly 19 that has a reinforced mounting bracket 20 connected to the side rail 14 by a plurality of bolts 22. The bracket 20 includes a horizontal plate 24 to which a vertical U-channel 26 is welded. The U-channel 26 has side walls 28 and 30 joined to a front wall 32. The side walls 28 and 30 have cutaway sections 34 that provide a bottom seat 36 to which a lift air spring 38 can be connected by bolts 40.

A bottom plate 42 is welded to the vertical channel member 26 and extends inboard, which allows a vertical connecting plate 44 to be welded both to the bottom plate 42 and to the side wall 30. A cross channel assembly 46 includes two channel members 48 and 50 that are fastened to opposite sides of the connecting plate 44 by a plurality of bolts 52. Over their length, separation between the channel members 48 and 50 is maintained by a centrally located spacer plate 54. This spacer plate provides an overall composite thickness between the channel members and the spacer plate of about ¾ inch. The cross channel assembly 46 is connected to a similar hanger assembly on the opposite side of the vehicle.

A fabricated spring seat 58 has a lower plate 60 by which it is connected to the axle 12 by a plurality of bolts 62. The spring seat 58 also has an upper plate 64 to which an air spring 66 is connected. The upper side of the air spring 66 is connected to a bracket 68 that is fastened by bolts 70 to the side rail 14.

The plate 68 has a section 72 that extends forwardly and inwardly of the spring 66. A pair of parallel spaced dogs 74 and 76 are welded to the section 72. In addition, two channel members 78 and 80 are welded to and project upwardly from the axle seat assembly 58, and the angle members 78 and 80 have spaced parallel sides 82 and 84.

A torque beam 86 has an end journalled on a bushing assembly 88 that is mounted between the side walls 28 and 30 of the hanger 18. The other end 92 of the torque beam 86 is journalled on a bushing assembly 94 that is mounted between the legs 82 and 84 of the angle members 78 and 80. A plate 96 is welded to the torque beam 86, and the upper side of the lift spring 38 is connected to the plate 96 by bolts 98.

A shock absorber 100 has an upper end 102 pivotally connected to a bracket 104 that extends from the hanger assembly 19. The lower end 106 of the shock absorber 100 is pivotally connected to the axle seat assembly 58.

It will be understood that similar suspension components are installed on the other side of the vehicle These include components corresponding to the hanger assembly 18, the lift air spring 38, the axle seat assembly 58, the air spring 66, the bracket 68, the torque beam 86 and the shock absorber 100. It will be noted that there is no sway bar or lateral guide.

A wishbone stabilizer assembly 110 extends between the suspension assembly 10 and the suspension assembly that is on the opposite side of the vehicle. The wishbone stabilizer assembly 110 has a pair of diverging arms 112 and 114 having ends 116 and 118, respectively, that merge together and are welded to an end plate 120 as well as top and bottom plates 122 and 124. Also welded to this assembly is a metal sleeve 126.

A hole 128 is cut through the assembly consisting of the channel members 48 and 50 and the spacer plate 54. A resilient bushing 130 is positioned within the hole 128, and an elongated one-inch bolt 132 extends through the metal sleeve 126 and the resilient bushing 130 with the head of the bolt bearing against the end of the sleeve 126. A nut 134 threads against a plate 136.

A marsh spring 138 is compressed between the plate 120 and the channel member 50. Another marsh spring 140 is compressed between the plate 136 and the channel member 48. Each marsh spring 138 and 140 is initially about 3 ¼ inch outside diameter and 1¼ inch long. After tightening the bolt 132 and nut 134, these marsh springs should be reduced to lengths of about ¾ inch each. Suitable provisions, such as a cotter key (not shown) are provided for locking the nut 134 in its tightened position.

At their opposite ends, each of the diverging arms 112 and 114 is formed with an outer bushing sleeve 144. The sleeve end 144 of the arm 112 is journalled on a bushing assembly 146 that is supported between the ears 74 and 76 of the axle seat assembly 58. The sleeve 144 of the arm 114 is similarly journalled on a bushing assembly (not shown) on the right side of the vehicle. A reinforcing bar 148 extends between the two arms 112 and 114 and is welded to them to strengthen the wishbone stabilizer assembly.

A support bracket 150 is connected to the axle 12 by the bolts 60. A double acting hydraulic cylinder 152 is installed between the bracket 150 and the tie rod 18 by way of a clamp 154. The double acting hydraulic cylinder 152 stabilizes the wheels in the manner known in the art.

Installation and Operation

This suspension system 10 can be readily installed quickly with conventional wrenches. The hanger assembly 19 is installed by connecting the bolts 22 to the side rail 14. The bracket 68 is also installed by connecting the bolts 70 in place. The cross channel assembly 46 is connected by the bolts 52 to the hanger assembly 19 (and to the corresponding hanger assembly on the opposite side of the vehicle). The axle seat assembly 58 is bolted to the axle 12 and the air spring 66 is installed. Likewise, the torque beam 86 is installed on the bushing assemblies 88 and 94, and the lift spring 38 is installed. The wishbone stabilizer assembly is readily installed by mounting the bushing 130 in place and extending the bolt 132 through the sleeve 126, the marsh spring 138, the bushing 130, the marsh spring 140, and the plate 136 and tightening the nut 134 to compress the marsh springs.

The bushing assembly 146 is installed to connect the end 144 to the ears 74 and 76 of the axle seat assembly 58. There is a similar connection of the end of the other arm 114 to an axle seat assembly on the other side of the vehicle.

It should be noted that the wishbone stabilizer assembly 110 is below a drive shaft of the vehicle. Therefore, even though the arms 112 and 114 merge to the center of the vehicle, they do not interfere with the drive shaft. The torque beam 86 is wholly outboard of the drive shaft, so interference is thereby avoided. Even when the axle 12 moves upwardly relative to the vehicle chassis, interference is avoided because the outer ends of the arms 112 and 114 are outboard of the drive shaft. The cross member 148 is located far enough forward to avoid interference with the drive shaft.

The wishbone stabilizer assembly 110 cooperates with the torque beam 86 (on each side of the vehicle) to provide parallelogram stabilization of the pitch of the axle 12. In other words, in a longitudinal direction, as viewed in FIG. 1, the torque beam 86 and the stabilizer assembly arm 112 form a parallelogram. In addition, the wishbone stabilizer assembly 110 provides lateral control and provides a common link between the left and right sides of the suspension assembly so that no sway bar is required.

The suspension system is very compact with the lift spring 38 between the seat 36 and the torque beam 86 allowing for raising of the axle 12 when the vehicle is not loaded. The cross channel assembly 46 provides stability between the hanger assemblies. It also integrates the two hanger assemblies into a single interconnected component. At the same time, it provides a connection point for the forward central portion of the wishbone stabilizer assembly 110.

Both the air spring 66 and the lift spring 38 have internal bumpers, which are of conventional design and construction. The internal bumper in the air spring 66 acts as a stop to limit upward movement of the axle 12. The internal bumper in the lift spring 38 works in conjunction with full extension of the shock absorber 100 to limit downward movement of the axle 12.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A suspension system for a vehicle having a chassis and an axle comprising a hanger depending from one side of the chassis, a cross member extending transversely from the hanger to a like hanger depending from the other side of the chassis, an axle seat connected to the axle, a torque beam pivotally connected between the hanger and the axle seat, spring means connected between the axle seat and the chassis, and a wishbone stabilizer assembly having two arms joined together at one end of each and diverging therefrom to spaced outer ends, means for pivotally connecting the joined ends to the cross member, and means to pivotally connect the outer end of an arm to the axle seat to form a parallelogram with the torque beam with respect to forces applied in a generally vertical and generally longitudinal plane for stabilization of the pitch of the axle, the outer end of the other arm being pivotally connected to a like axle seat on the opposite side of the vehicle.

2. The suspension system of claim 1 wherein the torque beam is above the wishbone member.

3. The suspension system of claim 2 wherein the spring means comprises an air spring.

4. The suspension system of claim 3 including an axle lift air spring connected between the hanger and the torque beam.

5. The suspension system of claim 4 wherein the hanger has a recessed area for receiving the axle lift air spring.

6. The suspension system of claim 1 wherein the means to pivotally connect the joined ends to the cross member comprises a grommet arrangement.

7. The suspension system of claim 6 wherein the grommet arrangement comprises a hole through the cross member, a resilient sleeve lining the hole, a resilient grommet on each side of and of larger diameter than the hole, and means integral with the joined ends and cooperative with the cross member to compress the grommets when the wishbone member moves relative to the cross member.

8. A suspension system for a vehicle having a chassis and an axle comprising a hanger connected to and depending downwardly from the left side of the chassis, a spring seat supported by the hanger, a cross member connected to the hanger and extending transversely of the chassis for connection to a like hanger on the right side of the vehicle, an axle seat connected to the left portion of the axle, spring means connected between the axle seat and the chassis, a torque beam having one end pivotally connected to the hanger and an opposite end pivotally connected to the axle seat, and a stabilizer having three connecting points, means for pivotally connecting a first of the connecting points to the cross member at a location generally equidistant between the sides of the chassis, means for pivotally connecting the second and third connecting points to the axle seat and to a like axle seat on the opposite side of the vehicle, and means for resisting variations in the distance between the second and third connecting points.

9. The suspension system of claim 8 wherein the stabilizer has two arms joined at the first point and diverging to the second and third points, and the resisting means comprises a rigid member connected between the arms.

10. The suspension system of claim 8 wherein the longitudinal distance between the first connecting point and either the second or third connecting point is substantially equal to the length of the torque beam.

11. The suspension system of claim 8 including a spring connected between the hanger and the torque beam for pushing the torque beam upwardly and thereby raising the axle, the spring being directly below the torque beam.

12. The suspension system of claim 8 including a shock absorber connected between the chassis and the axle seat.

13. The suspension system of claim 12 wherein the vehicle has wheel mounts on the ends of the axle and a tie rod connected between the wheel mounts on opposite sides of the axle, a bracket supported from the axle, and a double acting hydraulic cylinder connected between the bracket and the tie rod.

* * * * *